UNITED STATES PATENT OFFICE 2,525,542

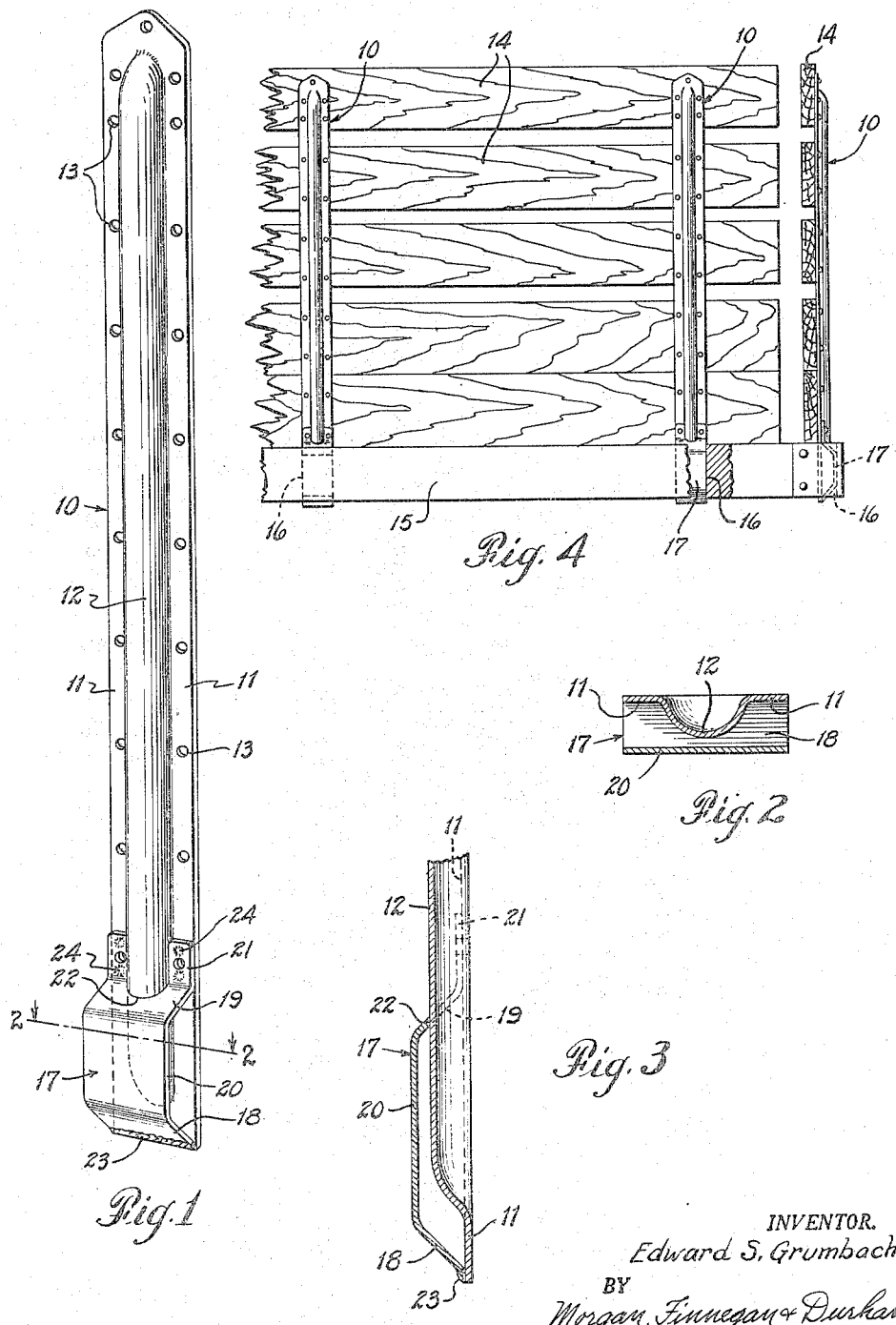

TRUCK BODY STAKE

Edward S. Grumbache, Paris, Ill., assignor to Electrographic Corporation, New York, N. Y., a corporation of Delaware Application June 17, 1947, Serial No. 755,064

3 Claims. (Cl. 296—43)

The present invention relates to a new and improved truck body stake.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a perspective view of a truck body stake embodying the present invention;

Fig. 2 is a cross-sectional view taken along line 2—2 of Fig. 1;

Fig. 3 is a longitudinal cross-sectional view taken centrally of the truck body stake shown in Fig. 1 at the lower end thereof; and, Fig. 4 is a side elevation of the truck body stake of the present invention such as that illustratively shown in Fig. 1 assembled with suitable side boards and installed on a truck body or bed.

The present invention has for an object the provision of an economical, strong and efficient stake for the bed or body of a truck or similar vehicle having easily installed means for adapting the stake for use with various truck bodies having different sized stake holding openings.

Referring now in detail to the illustrative embodiment of the invention shown by way of example in the accompanying drawings, the numeral 10 denotes generally a truck body stake which is made preferably from a flat, rectangular blank of steel or other suitable material pressed into the form shown. The stake is thus provided with a flat marginal portion 11 extending along either longitudinal edge of the stake, and at the top and bottom ends as well. Centrally of the stake but not extending entirely to the ends is a longitudinally extending curved portion 12 forming a convex surface on one side of the stake and a concavity in the opposite surface.

A plurality of apertures 13 are provided in the flat marginal portion 11 of the stake, whereby screws or nails may be used to attach side boards 14 to a plurality of the stakes, as shown in Fig. 4. Such stakes, when assembled with side board as shown, are adapted to be mounted on the flat bed or body 15 of a truck, the lower ends of the stakes being received in suitable openings 16 which are provided at spaced intervals around the edges of the truck bed for the purpose.

In order that the stake 10 as herein disclosed may be produced in mass quantities of identical form but adapted for truck beds having different sized stake holes 16, a separate end plate or adapter 17 is provided in making the finished stake. The adapter 17 is also preferably formed of steel or similar material and is pressed into the shape shown, providing a pair of inclined portions 18 and 19 extending from the ends of a central portion 20, and having flat ears 21 extending from inclined portion 19. Said ears are formed by cutting out the adapter as indicated at 22 so that its upper portion will conform to and embrace the convex surface of the central channeled portion 12 of the stake.

The adapter 17 is easily assembled with the stake 10 by bringing the lower edge of inclined portion 18 adjacent the lower flat edge of the stake and securing together by a line weld 23. Spot welds 24 are also preferably used to secure the adapter to the stake at the ears 21 supported on the flat marginal portion 11 of the stake.

With the construction for a truck body stake shown and described it will be apparent that the stake portion 10 may be economically formed in large numbers for all types of trucks, and may be relatively light in construction. The adapter 17 may be conveniently made in a number of different sizes, that is, with the flat portion 20 spaced closer to or further from the lower end of stake 10 by inclined portions 18 and 19 so that the stake end with adapter will fit tightly into the particular size stake pocket for which it is made. The adapter also greatly strengthens the stake at the place where it receives its greatest strain where it is seated in the truck body, and removes the need for making the stake of any greater strength through the rest of its length.

The invention in its broader aspects is not

What I claim is:

1. A truck body stake comprising, in combination, an elongated pressed metal body member having flat marginal edges and a central, longitudinally extending deformity, and a pressed metal adapter member to provide a spaced surface at the bottom of the body member for lodging the same in a stake hole, said adapter member comprising a flat blank of metal formed to have a substantially flat adapting portion spaced from said body member and integral portions extending at an angle therefrom and welded to said body member adjacent an end thereof, one of said integral portions being relieved to conform to an exterior raised surface of said central deformity.

2. A truck body stake comprising, in combination, an elongated pressed metal body member having flat marginal edges and a central, longitudinally extending deformity, and a pressed metal adapter member having a substantially flat adapting portion and integral portions extending at an angle therefrom and welded to said body member adjacent an end thereof, one of said integral portions being welded to said body member with a straight weld along a said flat marginal edge and the other of said integral portions being relieved to conform to an exterior raised surface of said central deformity and secured to a said flat marginal edge at either side of said deformity.

3. A truck body stake comprising, in combination, an elongated pressed metal body member having flat marginal edges and a central, longitudinally extending deformity, and a pressed metal adapter member having a substantially flat adapting portion and integral portions extending at an angle therefrom and welded to said body member adajacent an end thereof, one of said integral portions being welded to said body member with a straight weld along a said flat marginal edge and the other of said integral portions having a pair of flat integral ear portions one on either side of said deformity seated on respective ones of said flat marginal edges and welded thereto, said other of said integral portions being relieved to conform to an exterior raised surface of said central deformity.

EDWARD S. GRUMBACHE.

REFERENCES CITED

The following references are of record in the file of this patent:

UNITED STATES PATENTS

| Number | Name | Date |
|--------|------|------|
| 785,867 | Dodds | Mar. 28, 1905 |
| 825,029 | Dodds | July 3, 1906 |
| 834,138 | Keller | Oct. 23, 1906 |
| 859,555 | Frame | July 9, 1907 |
| 869,831 | De Remer | Oct. 29, 1907 |
| 2,011,155 | Neikirk | Aug. 13, 1935 |